(12) United States Patent
Brennan et al.

(10) Patent No.: US 8,410,005 B2
(45) Date of Patent: Apr. 2, 2013

(54) STACKS OF PRE-MOISTENED WIPES WITH UNIQUE FLUID RETENTION CHARACTERISTICS

(75) Inventors: Jonathan Paul Brennan, Sharonville, OH (US); Holly Ann Balasubramanian, Fort Thomas, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 1598 days.

(21) Appl. No.: 11/728,930

(22) Filed: Mar. 27, 2007

(65) Prior Publication Data

US 2007/0228064 A1 Oct. 4, 2007

Related U.S. Application Data

(60) Provisional application No. 60/787,467, filed on Mar. 30, 2006.

(51) Int. Cl.
*B32B 5/00* (2006.01)
(52) U.S. Cl. ............... 442/59; 442/118; 442/153
(58) Field of Classification Search .............. 442/59, 442/118, 153
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,763 A | 3/1970 | Hartman | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 4,100,324 A | 7/1978 | Anderson et al. | |
| 4,340,563 A | 7/1982 | Appel et al. | |
| 4,818,464 A | 4/1989 | Lau | |
| 4,853,281 A | 8/1989 | Win et al. | |
| 5,026,587 A * | 6/1991 | Austin et al. | 428/91 |
| 5,143,679 A | 9/1992 | Weber et al. | |
| 5,350,624 A | 9/1994 | Georger et al. | |
| 5,382,400 A | 1/1995 | Pike et al. | |
| 5,518,801 A | 5/1996 | Chappell et al. | |
| 5,628,097 A | 5/1997 | Benson et al. | |
| 5,650,214 A | 7/1997 | Anderson et al. | |
| 5,658,639 A | 8/1997 | Curro et al. | |
| 5,691,035 A | 11/1997 | Chappell et al. | |
| 5,759,926 A | 6/1998 | Pike et al. | |
| 5,853,859 A | 12/1998 | Levy et al. | |
| 5,914,084 A | 6/1999 | Benson et al. | |
| 5,916,661 A | 6/1999 | Benson et al. | |
| 6,110,848 A * | 8/2000 | Bouchette | 442/384 |
| 6,114,263 A | 9/2000 | Benson et al. | |
| 6,129,801 A | 10/2000 | Benson et al. | |

(Continued)

FOREIGN PATENT DOCUMENTS

CA 2524671 A1 * 4/2001

OTHER PUBLICATIONS

PCT International Search Report dated Oct. 30, 2007, 3 pages.

*Primary Examiner* — Peter Y Choi
(74) *Attorney, Agent, or Firm* — John G. Powell; Richard L. Alexander; William E. Gallagher

(57) ABSTRACT

Stacks of pre-moistened wipes wherein the wipes comprise a composite of at least two layers of fibrous nonwoven webs, which in turn comprise fibers with an average fiber denier from about 2.5 to about 6.0. The stacks of pre-moistened wipes are from about 50 to about 300 millimeters in height and have a saturation gradient index from about 1.0 to about 1.5.

23 Claims, 8 Drawing Sheets

U.S. PATENT DOCUMENTS

| | | |
|---|---|---|
| 6,200,669 B1 | 3/2001 | Marmon et al. |
| 6,202,845 B1 * | 3/2001 | Hill ............................... 206/449 |
| 6,315,114 B1 | 11/2001 | Keck et al. |
| 6,383,431 B1 | 5/2002 | Dobrin et al. |
| 6,778,403 B2 | 8/2004 | Takenaka et al. |
| 6,960,349 B2 | 11/2005 | Shantz et al. |
| 7,172,801 B2 | 2/2007 | Hoying et al. |
| 2002/0127937 A1 * | 9/2002 | Lange et al. ................... 442/328 |
| 2004/0121686 A1 * | 6/2004 | Wong et al. ................... 442/327 |
| 2004/0131820 A1 | 7/2004 | Turner et al. |
| 2004/0265534 A1 | 12/2004 | Curro et al. |
| 2005/0176326 A1 | 8/2005 | Bond et al. |
| 2005/0281976 A1 | 12/2005 | Curro et al. |
| 2007/0049153 A1 * | 3/2007 | Dunbar et al. ................ 442/400 |

* cited by examiner

STACKS OF PRE-MOISTENED WIPES WITH UNIQUE FLUID RETENTION CHARACTERISTICS

CROSS REFERENCE TO RELATED APPLICATION

This application claims the benefit of U.S. Provisional Application No. 60/787,467, filed Mar. 30, 2006.

FIELD OF THE INVENTION

The present invention relates to stacks of pre-moistened wipes with unique liquid retention characteristics, wherein the wipes comprise composites of fibrous nonwoven webs.

BACKGROUND OF THE INVENTION

Non-woven webs are a ubiquitous part of daily life. Non-woven webs are currently used in a variety of disposable articles including, but not limited to, feminine hygiene products, diapers, training pants, adult incontinence products and wipes. Disposable wipes comprised of non-woven webs are widely used by consumers to clean surfaces, such as glass and ceramic tile, as well as to clean the skin of children and adults. Pre-moistened or wet wipes are also known.

Wet wipes, such as baby wipes for example, should be strong enough when pre-moistened with a lotion to maintain integrity in use, but also soft enough to give a pleasing and comfortable tactile sensation to the user(s). In addition, wet wipes should have sufficient cloth-like texture and porosity to be effective in cleaning the soiled skin of a user. Moreover, wet wipes should have fluid retention properties such that each wipe remains wet during extended storage periods.

In order to provide the wipes consumer with improved value and convenience, it may be desirable to provide the consumer with a large quantity of pre-moistened wipes with the aforementioned qualities in a portable, liquid impervious container. However, this can be problematic due to the tendency of the lotion to drain from the top of the stack of wet wipes to the bottom of the stack of wet wipes during storage. This tendency often results in the unsatisfactory result of the wipes at the top of the stack being too dry and the wipes at the bottom of the stack being too soggy.

Various methods have been utilized in order to reduce the tendency of a lotion to drain from the top to the bottom of a stack of pre-moistened wipes during storage, while providing the individual wipes with good surface cleaning characteristics. For example, pre-moistened wipes have been made with high amounts of absorbent cellulose fibers and relatively small amounts of fine synthetic fibers. The resulting wipes are characterized by planar surfaces and a relatively small average pore size. While a small average pore size may be beneficial for trapping and retaining liquid within the wipes while they are in a stack configuration, the wipes may have a dry feel during use, despite being saturated with lotion. Moreover, while these characteristics may provide for adequate cleaning of soiled surfaces, they may not provide the exceptionally soft cleaning experience that consumers of wet wipes desire.

By increasing the thickness of pre-moistened wipes, cleaning performance may be improved while achieving exceptional softness. However, increasing thickness typically requires the use of more raw materials, which in turn can make the wipes more expensive. To increase thickness without increasing cost, pre-moistened wipes have been made with decreased density and lofted texture. The resulting thicker, lower density wipes may be characterized by larger average pore sizes, which can allow particles to be captured and trapped within the pores of the wipe, thereby providing the wipe with good cleaning properties. However, these pre-moistened wipes may not provide for good liquid retention in a stack configuration, since the liquid may drain via gravity and other forces through the large pores. The poor liquid retention may limit the number of wipes that can be stored in a stack in a portable, liquid impervious container, without the lotion draining from the wipes that are toward the top of the stack. Consequently, these pre-moistened wipes may have reduced viability as a convenient and economic option for consumers.

It would therefore be desirable to provide a stack of pre-moistened wipes that are soft, thick and cloth-like with the good cleaning properties of wipes with relatively low density and a large average pore size that also have good lotion retention properties such that they may be stored and marketed in an economical stacked configuration.

Additionally, it would be desirable to provide a stack of soft, thick, cloth-like pre-moistened wipes with good cleaning properties that individually exhibit relatively high retention of lotion when stored in a stack, yet that provide a wet feel when subjected to the forces encountered during use by the consumer.

SUMMARY OF THE INVENTION

The present invention provides improvements in pre-moistened wipes as well as the stacks comprised thereof. The wipes comprise soft, thick, cloth-like pre-moistened wipes made from large denier synthetic fibers that have low densities and relatively large average pore sizes, and good liquid retention characteristics. The pre-moistened wipes may be stored long term in a stack in a liquid impervious container without all of the lotion draining from the top of the stack to the bottom of the stack. The wipes may have an absorptive capacity of from about 2.5 to about 15.0, or from about 4.0 to about 10.0 grams of liquid composition per grams of dry wipe. The wipes may be characterized by a wet thickness to basis weight ratio of from about 0.008 to about 0.015, or from about 0.008 to about 0.024, millimeters per grams per square meter (mm/gsm).

In some embodiments, the stacks of pre-moistened wipes of the present invention comprise pre-moistened wipes, which in turn comprise a composite of at least three layers. The first and third layers are nonwoven webs comprising synthetic fibers with an average fiber denier from about 2.5 to about 6.0. The composite further comprises a second layer comprising pulp. The first layer is joined to a face of the second layer in a face to face relationship by bonding between the layers, and the third layer is joined to a second face of the second layer in a face to face relationship by bonding between the layers. The bonding comprises intertwining of the fibers between the layers. Such bonding may be achieved via spunlacing (hydroentanglement). The pre-moistened wipes are characterized by a saturation loading from about 1.5 to about 6.0 grams of liquid composition per gram of wipe, wherein the liquid composition has a surface tension from about 20 to about 35, or from about 28 to about 32, dynes per centimeter. The pre-moistened wipes are further characterized by a dynamic absorption time from about 0.01 to about 0.4, or from about 0.01 to about 0.2, or from about 0.03 to about 0.1 seconds. The wipes are placed in a stack that may vary in height from about 50 to about 300 millimeters, or from about 75 to about 125 millimeters.

"Saturation gradient index" (SGI) is a measure of how well the wipes at the top of a stack retain moisture. The SGI of a stack of wipes is measured as described infra and is calculated as the ratio of the average lotion load of the bottommost wipes in the stack versus the topmost wipes in the stack. The ideal stack of wipes will have an SGI of about 1.0; that is, the topmost wipes will be equally as moist as the bottommost wipes. In the aforementioned embodiments, the stacks have a saturation gradient index from about 1.0 to about 1.5.

It is well known that the higher the stack of wipes, the more difficult it is to achieve a desirable SGI. Without wishing to be bound by theory, it is believed that a higher stack can create a greater pressure gradient between the topmost and bottommost wipes in the stack, which in turn causes more lotion to drain to the bottom of the stack. Despite this, the SGI of the present invention may be achieved even in embodiments in which the height of the stack of pre-moistened wipes is high, notwithstanding the fact that the wipes are characterized by low density and a large average pore size. Without wishing to be bound by theory, it is believed that the good fluid handling characteristics that provide for the SGI of the present invention result from stacking pre-moistened wipes that may be comprised of the combination of one or more of: large denier fibers to make the web layers that comprise the wipes; interlayer web bonding techniques; texture; and choice of lotion surface tension. The combination allows for each wipe to retain its lotion load within the stack despite the large average pore size which was heretofore thought to promote drainage of lotion from a wipe in a stack.

In some embodiments of the present invention, stacks of pre-moistened wipes are also from about 50 millimeters to about 300 millimeters in height, or from about 75 to about 125 millimeters in height, and have a saturation gradient index from about 1.0 to about 1.5. The composite comprises at least two layers of fibrous nonwoven webs. The composite is textured such that it comprises at least one first region being substantially in the plane of the composite and at least one second non-planar region; the second non-planar region comprises out-of-said-plane protruding elements. The wipes are further comprised of synthetic fibers with an average fiber denier from about 1.0 to about 6.0. The wipes are characterized by a saturation loading from about 1.5 to about 6.0 grams of liquid composition per gram of wipe, wherein the liquid composition has a surface tension from about 20 to about 35, or from about 28 to about 32, dynes per centimeter. In other embodiments, these wipes may further comprise pores with a pore volume distribution and an average pore radius, such that when said pore volume distribution is plotted against the average pore radius, a plot comprising a multimodal distribution is obtained, wherein at least one peak is below about 200 microns and at least one peak is above about 300 microns.

Without wishing to be bound by theory, it is believed that the texture provided by the at least one planar region and the at least one non-planar region may provide for the multimodal distribution of average pore sizes, which is discussed at length infra. The multimodal distribution demonstrates that the wipes of the present invention have large amounts of relatively small pores and large amounts of relatively large pores. It is hypothesized, without being bound thereto, that while the small pores aid the wipes in the retention of their lotion while in a stack, the large pores allow for expression of the lotion under the forces that can be encountered during consumer use. Thus, a wipe that retains its lotion and that has a moist feel during use is provided by the present invention.

BRIEF DESCRIPTION OF THE DRAWINGS

While the specification concludes with claims particularly pointing out and distinctly claiming the present invention, it is believed that the present invention will be better understood from the following description taken in conjunction with the accompanying drawings in which like reference numerals identify like elements.

DETAILED DESCRIPTION OF THE INVENTION

I. Definitions

Figure 1:
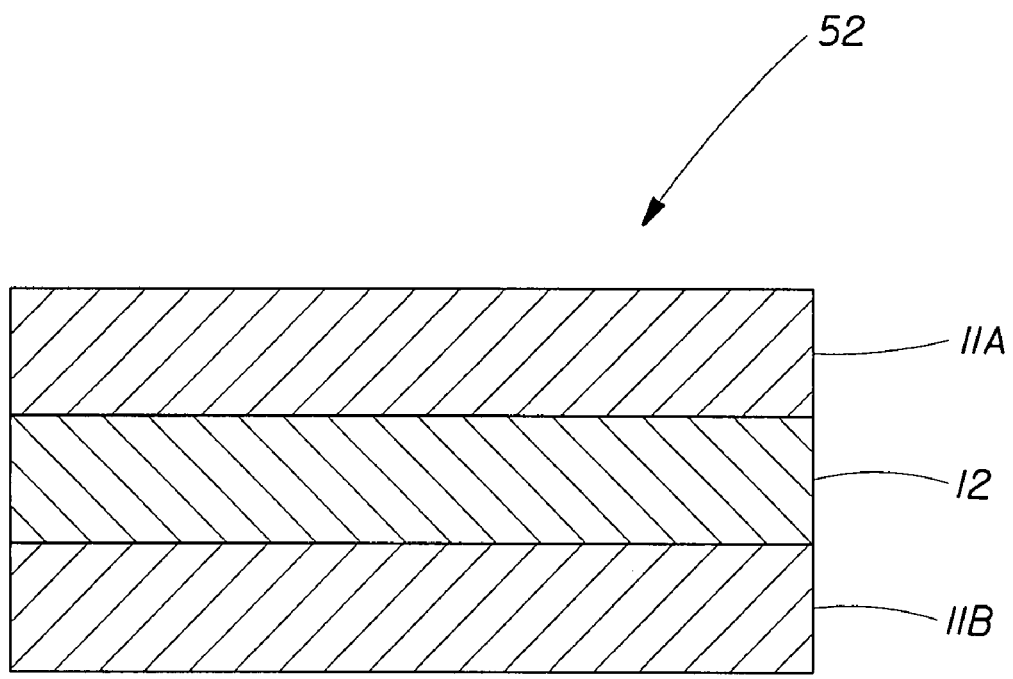
FIG. 1 is a cross-sectional view of one embodiment of a pre-moistened wipe of the present invention.

"Fiber" as used herein, refers to the unit which forms the basic element of the web disclosed herein. Fibers include staple fibers, fibers longer than staple fibers that are not continuous, and continuous fibers, which are sometimes referred to in the art as "substantially continuous filaments" or simply "filaments". The method in which the fiber is prepared will determine if the fiber is a staple fiber or a continuous filament.

"Polymer" as used herein, generally includes, but is not limited to: homopolymers; copolymers, for example block, graft, random and alternating copolymers, terpolymers, etc.; and blends and modifications thereof. In addition, unless otherwise specifically limited, the term "polymer" includes all possible geometric configurations of the material. The configurations include, but are not limited to, isotactic, atactic, syndiotactic and random symmetries.

"Monocomponent fiber" as used herein, refers to a fiber formed from using one or more extruders from only one polymer. This is not meant to exclude fibers formed from one polymer to which small amounts of additives have been added. Additives may be added to the polymer for the purposes of providing the resulting fiber with coloration, antistatic properties, lubrication, hydrophilicity, and the like. When additives are used in the present invention, they may be present in the resulting fiber at less than about 5 weight percent and more typically less than about 2 weight percent.

"Multicomponent fiber" as used herein refers to a fiber formed from two or more different polymers that are extruded from separate extruders and spun together to form one fiber.

"Bicomponent fibers" are one type of multicomponent fiber, and are formed from two different polymers. Bicomponent fibers may sometimes be referred to as "conjugate fibers" or "multicomponent fibers". Bicomponent fibers may be comprised of polymers that are substantially constantly positioned in distinct zones, both across the cross-section of the bicomponent fibers and along their length. Non-limiting examples of such bicomponent fibers include, but are not limited to: sheath/core arrangements, wherein one polymer is surrounded by another; side-by-side arrangements; segmented pie arrangements; or even "islands-in-the-sea" arrangements. Each of the aforementioned polymer arrangements is known in the art of multicomponent (including bicomponent) fibers.

Bicomponent fibers can be splittable fibers; such fibers are capable of being split lengthwise before or during processing into multiple fibers with each of the multiple fibers having a smaller cross-sectional dimension than that of the original bicomponent fiber. Splittable fibers have been shown to produce softer nonwoven webs due to their reduced cross-sectional dimensions. Representative splittable fibers useful in the present invention include type T-502 and T-512 16 segment PET/nylon 6, 2.5 denier fibers, and type T-522 16 segment PET/PP splittable fibers, all of which are available from Fiber Innovation Technology, Johnson City, Tenn.

"Biconstituent fibers" as used herein, refers to fibers which have been formed from at least two starting polymers extruded as a blend from the same extruder. Biconstituent fibers may have the various polymer components arranged in relatively constantly positioned distinct zones across the cross-sectional area of the fiber and the various polymers are usually not continuous along the entire length of the fiber. In the alternative, biconstituent fibers may comprise a blend, that may be homogeneous or otherwise, of the at least two starting polymers. For example, a bicoconstituent fiber may be formed from starting polymers which differ only in molecular weight.

The polymers comprising biconstituent fibers may form fibrils, which may begin and end at random along the length of the fiber. Biconstituent fibers may sometimes be referred to as multiconstituent fibers.

The terms "non-round fibers" and "shaped fibers" as used interchangeably herein, refer to fibers having a cross-section that is not circular, and includes, but is not limited to those fibers that are "shaped fibers" and "capillary channel fibers." Such fibers can be solid or hollow, and they can be tri-lobal, delta-shaped, and are preferably fibers having capillary channels on their outer surfaces. The capillary channels can be of various cross-sectional shapes such as "U-shaped", "H-shaped", "C-shaped" and "V-shaped". One preferred capillary channel fiber is T-401, designated as 4DG fiber available from Fiber Innovation Technologies, Johnson City, Tenn. T-401 fiber is a polyethylene terephthalate (PET polyester). Further examples of shaped fibers of use in the present invention are found in U.S. Pat. Pub. No. 2005/0176326 A1.

The terms "nonwoven web" or "web" are used interchangeably herein, and refer to a layer of individual fibers or threads that are interlaid, but not in a precisely identifiable manner as in a knitted or woven web. Nonwoven webs may be made via processes known in the art, including those that comprise the following non-limiting examples. Fiber laying processes of use may include, but are not limited to: carding; airlaying; and wetlaying. Processes comprising filament spinning from resin and integrated webforming include, but are not limited to: spunbonding; meltblowing; coforming; and forming spunbond-meltblown-spunbond composites. Fiber bonding processes of use may include, but are not limited to: spunlacing (i.e. hydroentanglement); cold calendering; hot calendering; air thru bonding; chemical bonding; needle punching; and combinations thereof.

"Meltblown" as used herein, refers to webs comprising "meltblown fibers". "Meltblown fibers" are fibers formed by extruding a molten thermoplastic material through a plurality of fine, sometimes circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 issued to Butin. Meltblown fibers may be microfibers, which may be continuous or discontinuous, and are generally smaller than 10 microns in average diameter. The term "meltblown" is also intended to cover other processes in which a high velocity gas (usually air) is used to aid in the formation of the filaments, such as melt spraying or centrifugal spinning.

"Spunbond" as used herein, refers to webs comprising "spunbond fibers". "Spunbond fibers" refers to small diameter fibers of polymeric material. Spunbond fibers may be formed by extruding molten thermoplastic material as filaments from a plurality of fine, usually circular capillaries of a spinneret with the diameter of the extruded filaments then being rapidly reduced as in, for example, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) may be achieved by various methods including, but not limited to, those described in U.S. Pat. No. 6,200,669 to Marmon et al. and U.S. Pat. No. 5,759,926 to Pike et al.

"Airlaying" or "airlaid" is a well known process by which a fibrous nonwoven layer can be formed. In the airlaying process, bundles of small fibers having typical lengths ranging from about 3 to about 19 millimeters (mm) are separated and entrained in an air supply and then deposited onto a forming screen, usually with the assistance of a vacuum supply. The randomly deposited fibers then are bonded to one another using, for example, hot air or a spray adhesive.

The terms "coform nonwoven web" or "coform material" as used herein, mean composite materials comprising a mixture or stabilized matrix of thermoplastic filaments and at least one additional material, usually called the "second material" or the "secondary material". As an example, coform materials may be made by a process in which at least one meltblown die head is arranged near a chute through which the second material is added to the web while it is forming. The second material may be, for example, an absorbent material such as fibrous organic materials such as woody and non-wood cellulosic fibers, including, but not limited to: cotton; rayon; recycled paper; pulp fluff; superabsorbent materials such as superabsorbent particles and fibers; inorganic absorbent materials and treated polymeric staple fibers and the like; or a non-absorbent material, such as non-absorbent staple fibers or non-absorbent particles. Exemplary coform materials are disclosed in U.S. Pat. No. 5,350,624 to Georger et al.; U.S. Pat. No. 4,100,324 to Anderson et al.; and U.S. Pat. No. 4,818,464 to Lau et al.

"Bonded carded web" refers to webs that are made from staple fibers which are sent through a combing or carding unit, which separates or breaks apart and aligns the staple fibers in the machine direction to form a generally machine direction-oriented fibrous nonwoven web. Such fibers are usually purchased in bales which are placed in an opener/blender or picker which separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calender rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

"Composite" as used herein, refers to superimposed layers of nonwoven web that are bonded together to form a wipe. Layers of material(s), such as pulp for example, may be interposed between the layers of nonwoven web and may be bonded together with the layers of nonwoven web to form a wipe. Bonding methods of use include, but are not limited to: spunlacing (hydroentanglement); hydroforming; and combinations thereof. Without wishing to be bound by theory, bonding steps of use in the present invention cause the fibers of the different layers of the composite to intertwine with one another. It is believed that the intertwining of the fibers between the layers holds the layers together such that the layers are no longer distinct and will not delaminate when pulled apart. This is in contrast to a laminate that is separable into the base layers from which it is comprised.

"Wipe" as used herein, refers to an article that is comprised of one or more layers of nonwoven web.

"Basis weight" as used herein, means the weight per unit area of the wipe, or the web(s) comprising the wipe. One method of determining basis weight, therefore, is to weigh a known area sample that is representative of the wipe or the web(s) comprising the wipe. The units of basis weight are typically expressed as grams per square meter (gsm); it is noted that in order to convert gsm to ounces of material per square yard, divide the number of gsm by a factor of 33.91. Fiber diameter may be expressed in microns, or in the case of staple fibers, denier, which is defined as the number of grams of fiber per 9,000 linear meters of fiber.

"Substantially" as used herein, refers to being largely but not necessarily wholly that which is specified.

"Planar" as used herein, refers to being in a single geometric plane, such as a plane defined by x and y axes. In contrast, "non-planar" as used herein, refers to being in more than one single geometric plane. For example, something which is three dimensional, i.e., has width, depth and height, or x, y and z axes, is non-planar.

"Protruding" as used herein, refers to extending above or below a plane.

"Stack" as used herein, refers to a neat pile of wipes. Based upon the assumption that there are at least three wipes in a stack, each wipe, except for the topmost and bottommost wipes in the stack, will be directly in face to face contact with the wipe directly above and below itself in the stack. Moreover, when viewed from above, the wipes will be layered on top of each other, or superimposed, such that only the topmost wipe of the stack will be visible. The height of the stack is measured from the bottom of the bottommost wipe in the stack to the top of the topmost wipe in the stack and is provided in units of millimeters (mm).

"Liquid composition" and "lotion" are used interchangeably herein and refer to any liquid, including, but not limited to a pure liquid such as water, an aqueous solution, a colloid, an emulsion, a suspension, a solution and mixtures thereof. The term "aqueous solution" as used herein, refers to a solution that is at least about 20%, at least about 40%, or even at least about 50% water by weight, and is no more than about 95%, or no more than about 90% water by weight.

"Pre-moistened" and "wet" are used interchangeably herein and refer to wipes which are moistened with a liquid composition prior to packaging in a generally moisture impervious container or wrapper. Such pre-moistened wipes, which can also be referred to as "wet wipes" and "towelettes", may be suitable for use in cleaning babies, as well as older children and adults.

"Saturation loading" and "lotion loading" are used interchangeably herein and refer to the amount of liquid composition applied to the wipe. In general, the amount of liquid composition applied may be chosen in order to provide maximum benefits to the end product comprised by the wipe. Saturation loading is typically expressed as grams of liquid composition per gram of dry wipe and is measured using the method described infra.

"Surface tension" as used herein, refers to the force at the interface between a liquid composition and air. Surface tension is typically expressed in dynes per centimeter (dynes/cm).

"Surfactant" as used herein, refers to materials which preferably orient toward an interface. Surfactants include the various surfactants known in the art, including: nonionic surfactants; anionic surfactants; cationic surfactants; amphoteric surfactants, zwitterionic surfactants; and mixtures thereof.

"Visible" as used herein, refers to being capable of being seen by the naked eye when viewed at a distance of 12 inches (in), or 30.48 centimeters (cm), under the unimpeded light of an ordinary incandescent 60 watt light bulb that is inserted in a fixture such as a table lamp. It follows that "visually distinct" as used herein refers to those features of nonwoven wipes, whether or not they are pre-moistened, that are readily visible and discernable when the wipe is subjected to normal use, such as the cleaning of a child's skin.

"Comprising" as used herein means that various components, ingredients or steps can be conjointly employed in practicing the present invention. Accordingly, the term "comprising" encompasses the more restrictive terms "consisting essentially of" and "consisting of".

"Absorbent" and "absorptive" are used interchangeably herein.

All percentages, ratios and proportions used herein are by weight percent of the composition, unless otherwise specified. All average values are calculated "by weight" of the composition or components thereof, unless otherwise expressly indicated. "Average molecular weight," or "molecular weight" for polymers, unless otherwise indicated, refers to weight average molecular weight. Weight average molecular weight, unless otherwise specified, is determined by gel permeation chromatography.

All numerical ranges disclosed herein, are meant to encompass each individual number within the range and to encompass any combination of the disclosed upper and lower limits of the ranges.

II. Wipe Composite

The wipes of the present invention are comprised of a composite of at least two layers of fibrous nonwoven webs. Embodiments of the wipes have a basis weight of from about 30 to about 120 gsm; from about 40 to about 70 gsm; or even from about 50 to about 60 gsm.

FIG. 1 shows one embodiment of a wipe 52 in which the composite comprises three layers. The first layer 11A is a spunbond nonwoven web, the second layer 12 comprises pulp and the third layer 11B is a spunbond nonwoven web. In this embodiment, the first layer 11A and third layer 11B of the wipe 52 are the substantially the same, and form the outside layers of the wipe. The first and third layers, 11A and 11B, will be so described in detail herein. However, it is recognized that the first and third layers, 11A and 11B, need not have substantially the same or identical compositions, basis weights, or other material properties.

The invention is described below as a pre-moistened wipe comprising a three-layer web having a second, inner layer 12 in between the two outer layers 11A and 11B. However, it is recognized that there need not be an inner layer 12, or in one alternative, there can be more than one inner layer 12. For example, instead of one airlaid forming head making the inner layer 12, two or more heads can lay down two or more inner layers.

In each layer of the composites of the present invention, a combination of fiber types, fiber shapes and average fiber deniers may be utilized to optimize the beneficial properties of each. For example, the outer layers, 11A and 11B, can comprise a certain percentage of synthetic fibers to give the web a soft, cloth-like feel; while the inner layer 12 (or in some embodiments, more than one inner layer collectively) may have a certain percentage of pulp fibers to provide for improved absorbency, liquid retention and thickness. In a further example, the outer layers, 11A and 11B, can comprise a certain percentage of shaped fibers in order to provide the finished wipe 52 with good opacity.

Other fibers of use in each layer include but are not limited to thermoplastic fibers, non-thermoplastic fibers and mixtures thereof. Non-limiting examples of non-thermoplastic fibers that may be of use include: rayon, which in turn includes but is not limited to viscose, lyocell and mixtures thereof; pulp; cotton; wool; silk; jute; linen; ramie; hemp; flax; camel hair; kenaf; and mixtures thereof. Non-limiting examples of thermoplastic fibers that may be of use include: polypropylene and copolymers of polypropylene; polyethylene and copolymers of polyethylene; polyamides and copolymers of polyamides; polyesters and copolymers of polyesters; aliphatic polyesteramides; lactic acid polymers; and lactide polymers; polyhydroxyalkanoates; and mixtures thereof. The aforementioned fibers and combinations of fibers may additionally comprise a certain percentage of each layer of the laminates as: multi-component, or conjugate fibers, such as bicomponent fibers; biconstituent fibers; non-round fibers; and combinations thereof. As noted above, each type of fiber is chosen to optimize the beneficial properties of each, such as liquid retention and softness.

In the present invention, synthetic fibers with relatively large fiber deniers make up a certain percentage of the outer layers, 11A and 11B. Synthetic fibers of use have an average fiber denier from about 1.0 to about 6.0, from about 2.5 to about 6.0, from about 2.0 to about 5.0, or from 2.5 to 4.0. Without wishing to be bound by theory, it is believed that the use of large denier fibers provides for a finished pre-moistened wipe 52 with a low density and a large average pore size. It is further hypothesized without being bound thereto, that the large pores allow the particles on the surface to be cleaned to be captured and trapped within the pores of the wipe 52, thereby providing the wipe with good cleaning characteristics.

The inner and outer layers of the composite are combined to form the pre-moistened wipes 52 of the present invention such that the resulting wipes may be characterized by specified percentages of the fiber types and shapes of which they are made. In some embodiments of the present invention, the wipes 52 may comprise from about 30% to about 70%, or from about 40% to about 60% of synthetic fibers. In addition, or in the alternative, the wipes 52 may comprise from about 70% to about 30%, or from about 60% to about 40% of pulp.

In some embodiments of the present invention, the outer layers, 11A and 11B, comprise fibrous nonwoven webs, which in turn are comprised of bicomponent fibers. The bicomponent fibers are in a sheath/core configuration, wherein the core comprises polypropylene and the sheath comprises polyethylene. Without wishing to be bound by theory, it is believed that these fibers provide the wipe 52 with outer layers that have sufficient slippage between the fibers, stretch and resilience, such that the wipes that are made therewith are particularly suited for additional processing steps such as adding texture. It is further hypothesized without being bound thereto, and discussed in greater detail infra, that in some embodiments of the present invention, the stretch and resilience may allow for the bimodal pore size distribution that is observed in some embodiments after the wipes 52 are provided with texture.

The fibrous nonwoven webs that make up the outer layers of the composite, may be made via processes known in the art as disclosed in the "Definitions" subsection supra. In some embodiments, the fibrous nonwoven webs are made via spunbonding.

The layers that make up the composite are held together via inter-layer bonding. Inter-layer bonding may be achieved via any method known in the art that provides for intertwining of enough fibers between the layers such that the composite will not de-laminate under conditions encountered during typical wipes usage. Non-limiting examples of such bonding processes include, but are not limited to spunlacing (hydroentanglement); hydroforming; and combinations thereof. Although a structure of separate layers permits preferential distribution of fiber types, it remains important that the constituent layers perform as a unitary web when utilized as a wet wipe, particularly in a baby wipe application. De-lamination of the layers during use detracts from the consumer benefits delivered from such a wet wipe.

In some embodiments of the present invention, the pre-moistened wipes 52 comprise a composite, which in turn comprises two outer layers, 11A and 11B, of spunbond synthetic nonwoven webs and an inner layer 12 of pulp, wherein the layers are bonded together via spunlacing. Without wishing to be bound by theory, it is believed that bonding between the layers occurs as a result of the transfer of energy from the water to the composite during the spunlacing (hydroentanglement) process. The energy transfer causes the pulp fibers of the inner layer 12 to intertwine with synthetic fibers of the outer layers 11A and 11B. It is further hypothesized without being bound thereto, that this intertwining of the inner layer 12 and outer layers, 11A and 11B, provides a pore size gradient across the layers. In some embodiments of the present invention, the pore size gradient decreases as the liquid moves from the outer, largely synthetic portions of the pre-moistened wipe 52 to the inner, largely pulp-containing portions of the wipe 52, and vice versa. It is believed that the pore size gradient may aid in the transfer of lotion to and from the inner, absorbent largely pulp layer 12. Consequently, the interlayer bonding step can be important as it can contribute to the fluid retention properties of the pre-moistened wipes 52 when they are in a stack 101, as well as to their lotion expression ability when subjected to typical in use forces.

Method of Making Composites

The composites may be made via any method known in the art. The fibrous nonwoven webs may be pre-formed in a process that is not in-line with the composite making process. For example, the outer fibrous nonwoven web layers, 11A and 11B, and the inner pulp layer 12 may be provided as bonded roll goods. However, FIG. 2 shows a schematic representation of an apparatus in which the fibrous nonwoven webs are made in-line with the composites.

Figure 2:
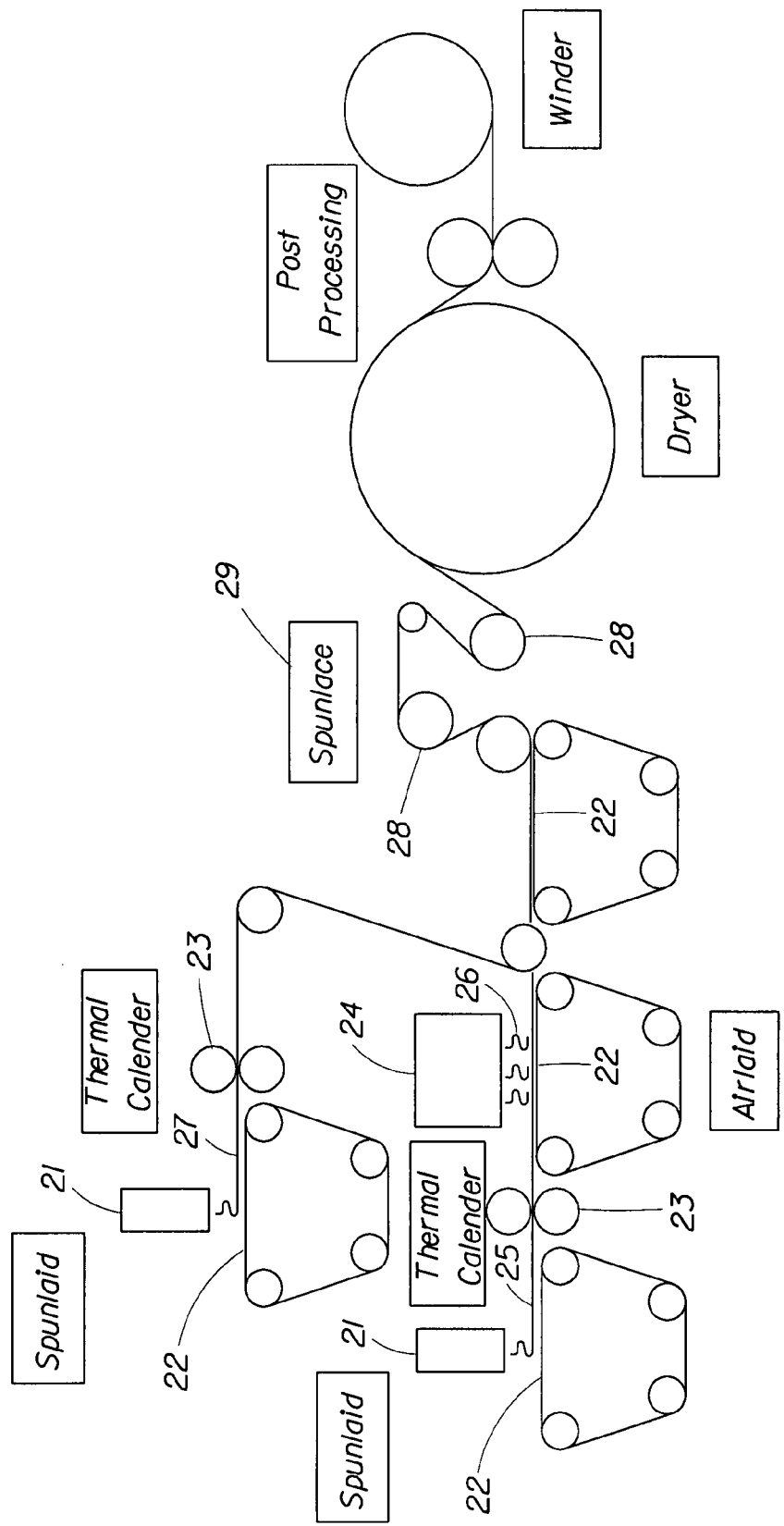
FIG. 2 is a schematic representation of a method of making a pre-moistened wipe of the present invention.

As shown in FIG. 2, one embodied method is a combination of spunlaying and airlaying processes. The fibrous nonwoven webs are made via two spunlaying sections 21 and the pulp layer is airlaid using one airlaying section 24. First one nonwoven web 25 is spunlaid, deposited onto a forming belt or screen 22 and bonded via thermal calendering 23. The pulp layer 26 is then directly airlaid onto the nonwoven web 25. A second nonwoven web 27 is spunlaid, bonded and laid directly on top of the pulp layer. As all three layers are formed on top of each other, the screen 22 is moved in the machine direction by rolls 28. In this way, the layers of the composite can be made and laid down in a continuous process. The direction of forming is referred to as the "machine direction" (MD), while the width of the web is measured in the "cross direction" (CD).

After all three layers of the composite are deposited in a layered relationship, the deposited fibers are moved by the screen 22 to a spunlacing (hydroentanglement) apparatus 29. The energy transfer from the impinging water causes the pulp fibers of the inner layer to intertwine with synthetic fibers of the outer layers and vice versa. After inter-layer bonding of the composite, it may be dried and additionally processed to give it texture as described below. The process of providing texture may be performed in-line with the composite making process or off-line, such as via rolling up of the laminate and transferring it to another line for texturing.

Texture

In some embodiments, the wipes 52 of the present invention have a lofted texture, which provides them with thickness and a cloth-like look and feel even when they are pre-moistened. The lofted texture also provides the wipes 52 with good cleaning and liquid retention characteristics despite their low density and large average pore size.

In some embodiments, the lofted texture comprises at least a first region 60 and at least a second region 66. In some embodiments, the lofted texture comprises a plurality of first and second regions 60 and 66. The first and second regions, 60 and 66, may be visually distinct from one another. In addition to first regions 60 being visually distinct from second regions 66, the first regions bound the second regions such that the second regions form visually distinct patterns on a web of the present invention. Examples of such visually distinct patterns are disclosed herein, and include, but are not limited to: regular patterns of diamond-shapes; wavy, undulating patterns; regular patterns of triangle-shapes; strips; blocks of first and second regions intermittently spaced; islands of second regions in first regions or vice versa; combinations of shapes and/or patterns; and the like.

Figure 3:
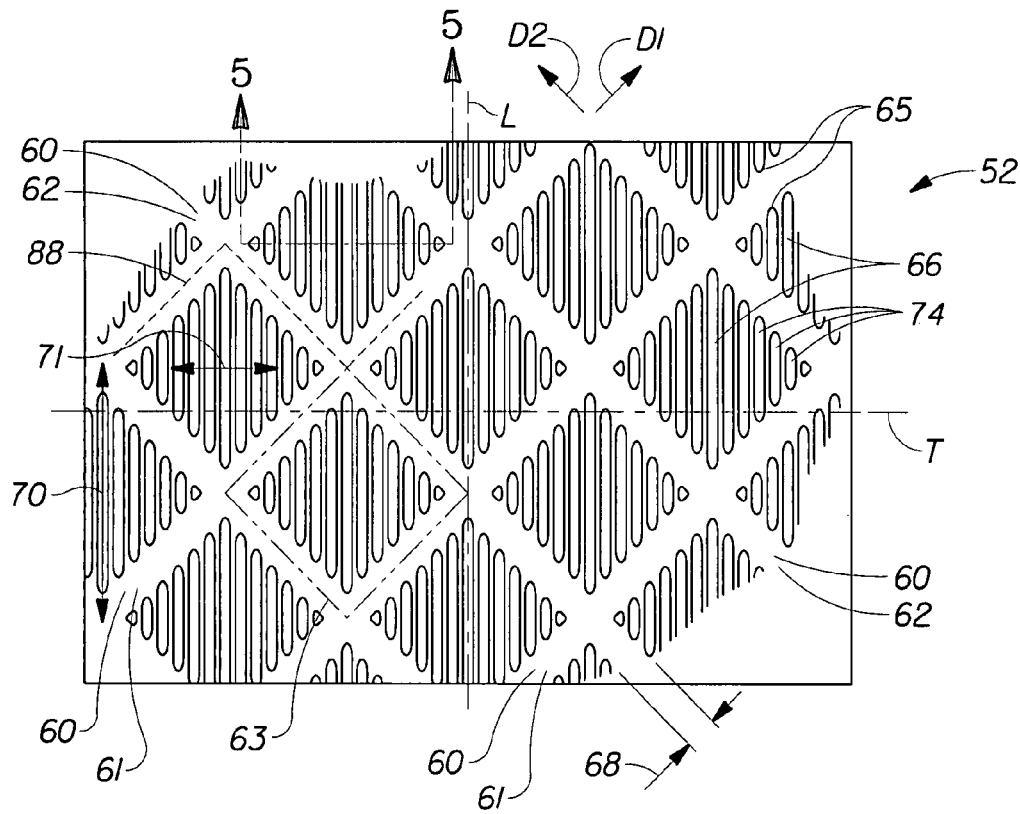
FIG. 3 is a plan view illustration of an embodiment of a pre-moistened wipe of the present invention.
Figure 4:
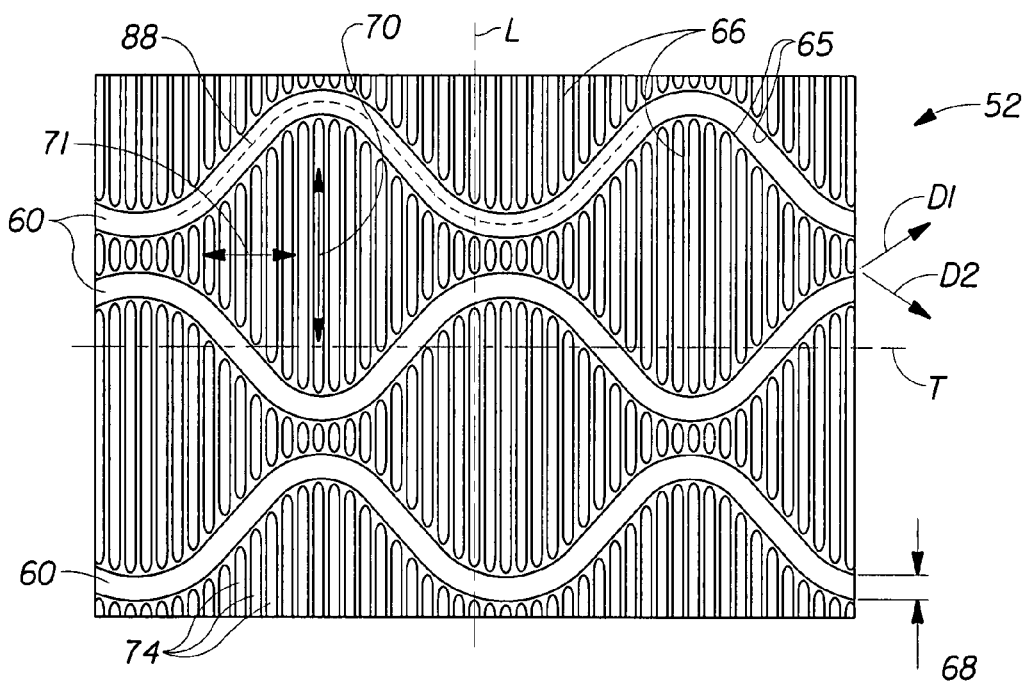
FIG. 4 is a plan view illustration of another embodiment of a pre-moistened wipe of the present invention.

Referring to FIGS. 3 and 4, two embodiments are shown of pre-moistened wipes having increased thickness, loft and correspondingly decreased density as compared to the same wipes without the added texture. The wipe 52 has two centerlines, a longitudinal centerline, which is also referred to hereinafter as an axis, line, or direction "L" and a transverse or lateral centerline, which is also referred to hereinafter as an axis, line, or direction "T". The transverse centerline "T" is generally perpendicular to the longitudinal centerline "L". In the process of making the layers of web which comprise the wipe, the longitudinal centerline can be parallel to the MD, and the transverse centerline can be parallel to the CD.

The wipe 52 includes a "strainable network" of distinct regions. As used herein, the term "strainable network" refers to an interconnected and interrelated group of regions which are able to be extended to some useful degree in a predetermined direction. Additionally, the strainable network may provide the wipe 52 with useful elastomeric properties. By "elastomeric" it is meant that, whereas the base wipe 52, i.e. the wipe prior to being texturized, may not be elastomeric when formed into the wipe of the present invention, the strainable network may impart strain-recovery properties to the wipe, such that it exhibits elastic-like behavior in response to an applied and subsequently released strain.

The strainable network includes a plurality of first regions 60 and a plurality of second regions 66. The wipe 52 also includes transitional regions 65 which are located at the interface between the first regions 60 and the second regions 66. The transitional regions 65 may exhibit complex combinations of the behavior of both the first region 60 and the second region 66. It is recognized that the various embodiments of the present invention have transitional regions; however, the present invention is largely defined by the behavior of the web material in distinctive regions (e.g., first regions 60 and second regions 66). Therefore, the ensuing description of the present invention will be concerned with the behavior of the wipe in the first regions 60 and the second regions 66 only since it is not significantly dependent upon the complex behavior of the wipe in the transitional regions 65.

While first regions 60 are described herein as a "plurality" of first regions 60, it is appreciated that in some embodiments, such as the embodiment of FIG. 4, the plurality of first regions 60 may form a single, interconnected, continuous network "region". As used herein, therefore, the term "plurality of first regions 60" encompasses interconnected first regions which form a single, continuous network region. Although interconnected into a single, continuous network region, first regions 60 can still be considered as discrete, interconnected and intersecting regions. For example, see regions 61 and 62, which are described below.

The wipe 52 has a first surface, (facing the viewer in FIGS. 3 and 4), and an opposing second surface (not shown). In the embodiment shown in FIG. 3, the strainable network includes a plurality of first regions 60 and a plurality of second regions 66. One set of first regions 60, indicated generally as 61, are linear and extend in a first direction, denoted generally as D1. The remaining first regions 60, indicated generally as 62, are linear and extend in a second direction, denoted generally as D2, which is substantially perpendicular to the first direction. While in this embodiment, the first direction is perpendicular to the second direction, other angular relationships between the first direction and the second direction may be suitable so long as the first regions 61 and 62 intersect one another. For example, the angle between the first and second directions can range from about 45° to about 135°, and can be 90° for example. The intersection of the first regions 61 and 62 can form a boundary, indicated by phantom line 63 in FIG. 3, which completely surrounds the second regions 66.

It is not necessary that intersecting first regions 61 and 62 be generally straight, as in the embodiment shown in FIG. 3. Furthermore, it is not necessary that first regions 60 be intersecting, as shown in the embodiment in FIG. 1. For example, as shown in FIG. 4, first regions 60 may comprise wavy, non-intersecting first regions 60, each of the wavy, non-intersecting first regions 60 forming a reticulated structure having portions extending in first directions D1 and second directions D2. In contrast to forming a pattern similar to that of FIG. 3 in which first regions 60 completely bound second regions 66, the wavy, non-intersecting first regions 60 shown in FIG. 4 separate, but do not completely bound, second regions 66.

In some embodiments, the width 68 of the first regions 60 is from about 0.02 inches to about 0.1 inches; in some embodiments it is from about 0.03 inches to about 0.05 inches. However, other width dimensions for the first regions 60 may be suitable. In some embodiments, such the one shown in FIG. 3, the first regions 61 and 62 are perpendicular to one another and equally spaced apart, therefore the second regions preferably have a generally square, or diamond, shape. Some embodiments include first regions having a width of about 0.04 inches spaced apart in parallel relationship on about a 0.212 inch center to center spacing. However, other shapes for the second region 66 are suitable and may be achieved by changing the spacing between the first regions and/or the alignment of the first regions 61 and 62 with respect to one another.

One notable attribute of first regions 60 is their formation of a "reticulated structure", a portion of which is illustrated in FIGS. 3 and 4, as dashed line 88. By "reticulated structure" with reference to first regions 60, it is meant that portions of the first region 60 can be modeled as a two-dimensional spring, providing for extension in the plane of the web, as well as supplying some restorative forces, allowing for some web elasticity.

While the first regions shown in FIGS. 3 and 4 are illustrative of currently preferred patterns for first regions 60, they are not intended to be limiting. Other intersecting and non-intersecting patterns are contemplated, with the only limitation being that both the first and second regions experience geometric deformation upon application of an applied strain, giving the wipe increased extensibility and elasticity in at least one direction.

As shown in FIGS. 3 and 4, the wipe 52 has been "formed" by methods disclosed below such that the wipe 52 exhibits extendible or elastomeric properties along an axis, which in the case of the illustrated embodiments is substantially parallel to the transverse axis of the wipe, when subjected to an applied axial elongation in a direction substantially parallel to the transverse axis. As used herein, the term "formed" refers to the creation of a desired structure or geometry upon a wipe 52 that will substantially retain the desired structure or geometry when it is not subjected to any externally applied elongation or forces.

Figure 5:
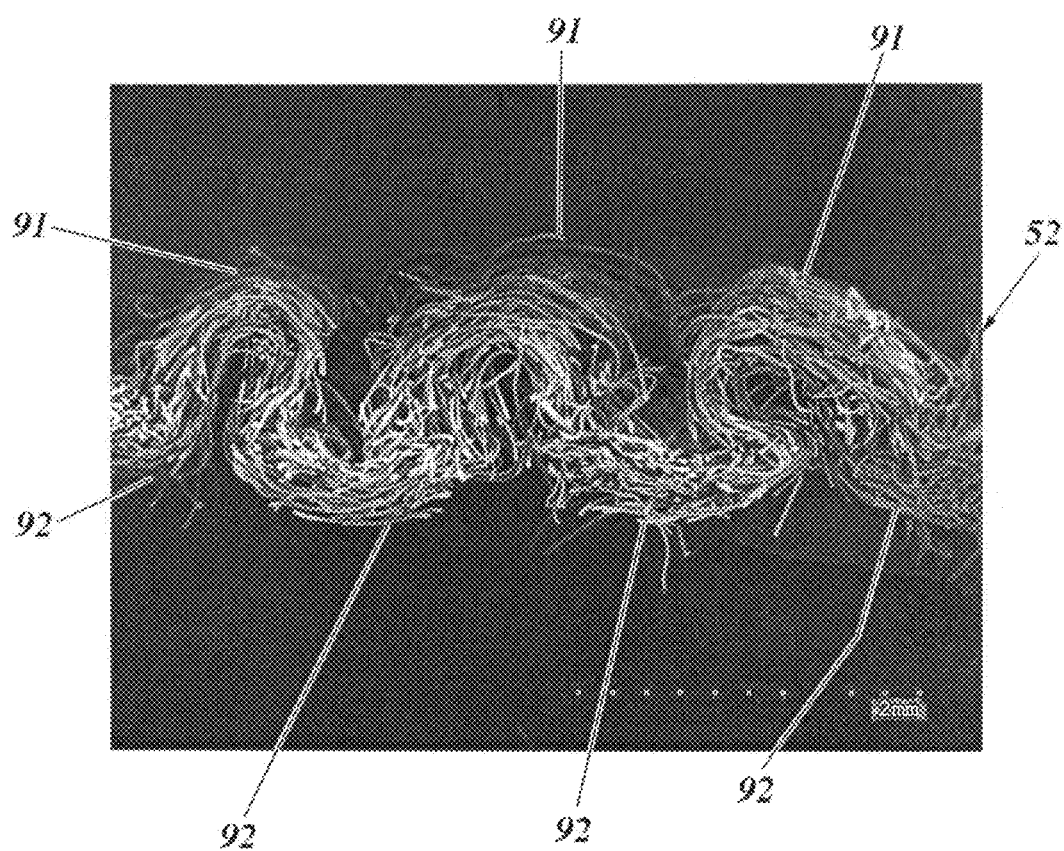
FIG. 5 is a scanning electron micrograph of a cross-sectional view of an embodiment of a pre-moistened wipe of the present invention.

First regions 60 are substantially macroscopically non-planar, and are substantially unmodified by subsequent processing such that they experience little or no out of plane deformation. That is, the material within the first regions 60 is in substantially the same condition before and after the formation step undergone by wipe 52. The second regions 66 include a plurality of raised rib-like elements 74. The rib-like elements may comprise ridges and furrows; FIG. 5 shows a scanning electron micrograph of a cross-sectional view of rib-like elements comprising ridges 91 and furrows 92. The rib-like elements 74 may be embossed, debossed or a combination thereof to form what can generally be described as "fan-folded" structures. Each fan-folded structure of rib-like elements 74 has a first or major rib axis 70 which is substantially parallel to the longitudinal axis of the wipe 52 and a second or minor rib axis 71 which is substantially parallel to the transverse axis of the wipe 52. For each rib-like element 74, the major rib axis 70 is substantially perpendicular to the minor rib axis 71. The rib-like elements 74 can be contiguous, having no unformed areas between them.

Figure 6:
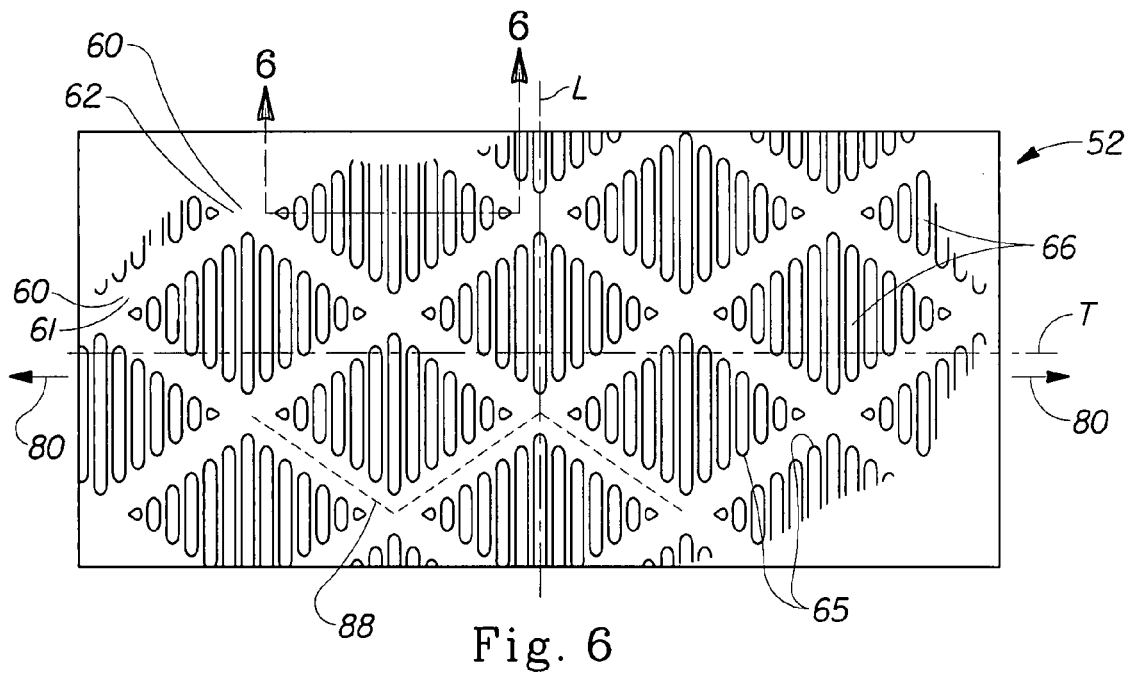
FIG. 6 is a plan view illustration of another embodiment of a pre-moistened wipe of the present invention.

The major rib axis 70 and minor rib axis 71 of the raised rib-like elements may be oriented relative to the plane of the wipe in ways other than shown in FIG. 3 or 6, such as by orienting the major rib axis 70 substantially parallel with the transverse axis of the wipe. Many benefits of the present invention can be realized even when the major axes 70 of each rib-like element 74 are not aligned parallel to one another.

As the wipe 52 is subjected to an applied axial strain, D, indicated by arrows 80, shown in FIG. 6, the rib-like elements 74 in the second regions 66 experience geometric deformation, or unfolding, and offer minimal resistance to the applied elongation. In addition, the shape of the first regions 60 changes as a result of the applied axial strain, due to the ability of the reticulated structure formed by the first regions 60, to act as a two-dimensional spring, i.e., to elongate by experiencing a change in the angular relationship between first direction D1 and second direction D2. As first regions 60 experience geometric deformation, second regions 66 experience a change in shape as well, since first regions 60 border, separate, and in some instances, bound second regions 66.

Accordingly, as the wipe 52 is subjected to the applied elongation, the first regions 60 experience geometric deformation, i.e., straightening out of the reticulated structure, thereby changing the shape of the second regions 66. The second regions 66 are extended or lengthened in a direction parallel to the direction of applied elongation, and shortened in a direction perpendicular to the direction of applied elongation. Other modes of geometric deformation are observed, as disclosed more fully below.

As can be seen in FIGS. 3 and 6, first regions 60, whether intersecting or not, generally have portions which extend in either first direction D1 or second direction D2 which have a major rib axis component, and a minor rib axis component in the plane of the wipe 52. In other words, in some embodiments, the first or second directions, D1 or D2, should not be configured such that either is parallel with either major or minor rib axes 70, 71, of second regions 66, as is described more fully below. Portions of first regions 60 which do not have both major or minor rib axis components, such as the point of intersection of first regions 60 in FIG. 3, are minimized, and are believed to have little impact on the extensible or elastomeric properties of the wipe 52.

Figure 7:
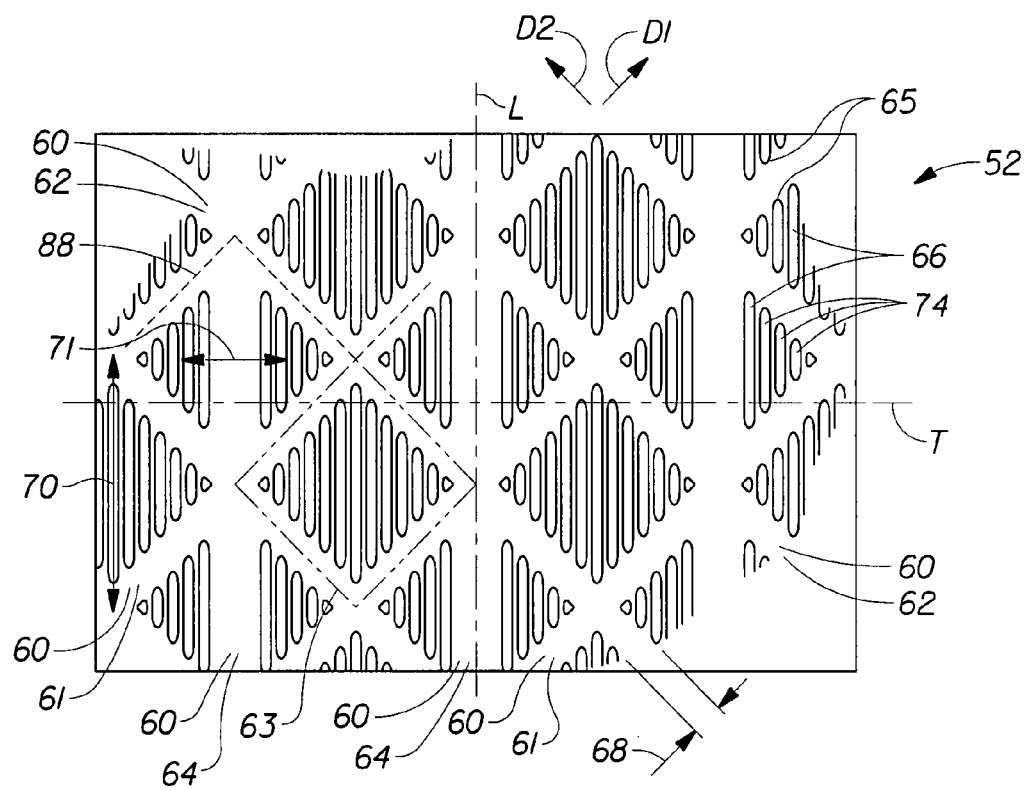
FIG. 7 is a plan view illustration of another embodiment of a pre-moistened wipe of the present invention.

While it may generally be desirable to minimize the portions of first regions 60 that do not have both major and minor rib axis components, many benefits of the present invention may be realized with substantial areas of first regions 60 aligned with either the major or minor axes of second regions 66. Such a configuration may be useful in retaining machine direction tensile strength when major rib axes 70 are in parallel alignment with longitudinal axis L, which in turn corresponds to the machine direction during web processing. Other configurations are contemplated, such as having some first regions 64 parallel to major rib axes 70, as shown in FIG. 7, but having the major rib axes 70 in parallel alignment with transverse axis T, which, in turn, can correspond to the cross machine direction during web processing.

Without being bound by theory, it is believed that the extensible, or elastic, nature of a wipe 52 of the present invention is due to the ability of the fan-folded structure of second regions 66 to "unfold" in a three-dimensional geometric manner along the rib-like elements. At the same time, the first regions 60 contract in a direction generally perpendicular to the applied loading, in a two-dimensional, geometric manner generally in the plane of the wipe 52, as shown in FIG. 4. The contraction of first regions 60 and resulting shape change of second regions 66 can be considered analogous to a two dimensional Poisson effect. For example, as best described with reference to FIG. 3, as the wipe 52 is extended in a direction generally parallel to the transverse centerline T, the shape of second regions 60 change as depicted in FIG. 4, with one dimension increasing, and another dimension decreasing. As discussed above, the simultaneous unfolding of second regions 66, and contraction of first regions 60, is provided for by avoiding substantial parallel alignment of the major or minor axes 70 or 71, with either the first or second directions, D1 or D2 of first regions 60.

The composites of the present invention may be imparted with first and second regions, 60 and 66, comprising further patterns as described in the commonly assigned Patent applications and publications listed in the following subsection. For example, the second regions 66 may comprise "tufts" or "loops" as respectively described in co-pending and co-assigned U.S. patent application Ser. Nos. 10/737,306 and 11/155,805.

Methods of Imparting Texture

The composites of the present invention may be imparted with texture via methods described in the following Patent applications and publications: U.S. Pat. Nos. 5,143,679; 5,518,801; 5,650,214; 5,691,035; 5,914,084; 6,114,263; 6,129,801; 6,383,431; 5,628,097; 5,658,639; and 5,916,661; WO Publication Nos.: 2003/0028165A1; WO 2004/059061; WO 2004/058117; and WO 2004/058118; U.S. Publication Nos.: 2004/0131820A1; and 2004/0265534A1.

Lotion Load

The textured composites are saturated or loaded with lotion in order to form the pre-moistened wipes 52 of the present invention. The saturation loading may occur individually, or after the wipes 52 are placed in a stack 101 in a liquid impervious container 100. In some embodiments, the pre-moistened wipes may be saturation loaded from about 1.5 to about 6.0 grams of lotion per gram of wipe, in other embodiments, they may be saturation loaded from about 2.5 to about 4.0 grams of lotion per gram of wipe.

Figure 8:
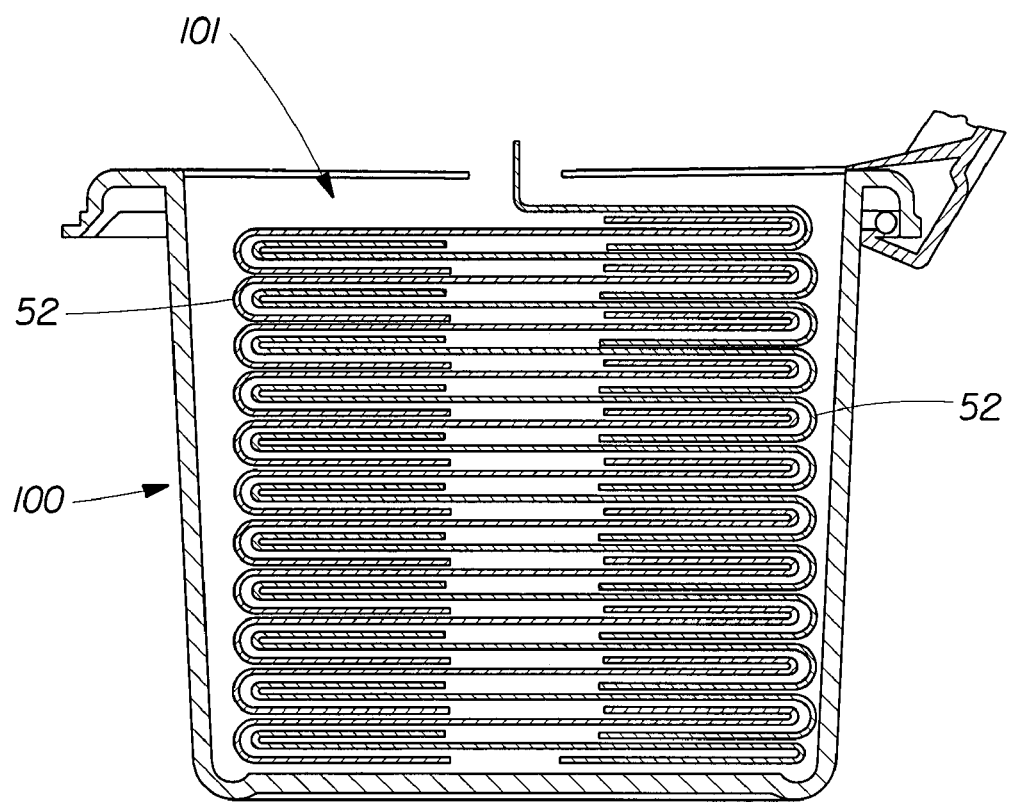
FIG. 8 is a cross-sectional view of an embodiment of a stack of wipes of the present invention in a tub.

As pictured in FIG. 8, the pre-moistened wipes may then be placed in the interior of a container 100, which may be liquid impervious, such as a plastic tub or a sealable packet, for storage and eventual sale to the consumer. The wipes may be folded and stacked 101. The wipes of the present invention may be folded in any of various known folding patterns, such as C-folding, Z-folding and quarter-folding. Use of a Z-fold pattern may enable a folded stack 101 of wipes to be interleaved with overlapping portions. Fold patterns and containers are disclosed more fully in commonly assigned U.S. Pat. No. 6,960,349. Alternatively, the wipes may include a continuous strip of material which has perforations between each wipe and which may be arranged in a stack 101 or wound into a roll for dispensing, one after the other, from a container, which may be liquid impervious.

The wipes of the present invention may further comprise prints, which may provide aesthetic appeal. Non-limiting examples of prints include figures, patterns, letters, pictures and combinations thereof.

III. Wipe Characteristics

The physical properties relating to the fluid retention characteristics of stacks 101 of pre-moistened wipes 52 (and the wipes comprising them) encompassed by the present invention, as well as those of known stacks and wipes, are measured as follows. The resulting data is discussed at length in the Examples section infra. The properties that are measured include: saturation load; saturation gradient index; absorptive capacity; dynamic absorption time; pore volume distribution; and the ratio of wet thickness to basis weight. Each test measurement was conducted at room temperature unless otherwise specified.

1. Saturation Load

The saturation load, often expressed as percent saturation, is defined as the percentage of the dry substrate's mass that the lotion mass represents. For example, a saturation load of 1.0 (equivalently, 100% saturation) indicates that the mass of lotion on the substrate is equal to the dry substrate mass.

The following equation is used to calculate saturation load of one wipe:

$$\text{Saturation Load} = \left[\frac{\text{wet wipe mass}}{(\text{wipe size}) * (\text{basis weight})}\right] - 1$$

2. Saturation Gradient Index

The saturation gradient index for a wipe stack is calculated as the ratio of the saturation load of a set number of wipes from the bottom of a stack to that of the same number of wipes from the top of the stack. For example, for an approximately 80 count wipe stack, the saturation gradient index is this ratio using 10 wipes from bottom and top; for an approximately 30 count wipe stack, 5 wipes from bottom and top are used; and for less than 30, only the top and bottom single wipes are used in the saturation gradient index calculation. The following equation illustrates the example of an 80 count stack saturation gradient index calculation:

$$\text{Saturation Gradient Index} = \frac{\text{average lotion load of bottom 10 wipes in stack}}{\text{average lotion load of top 10 wipes in stack}}$$

A saturation profile, or wetness gradient, exists in the stack when the saturation gradient index is greater than 1.0. In cases where the saturation gradient index is significantly greater than 1.0, e.g. over about 1.5, lotion is draining from the top of the stack and settling in the bottom of the container, such that there may be a noticeable difference in the wetness of the topmost wipes in the stack compared to that of the wipes nearest the bottom of the stack. A perfect tub of wipes would have a saturation gradient index of 1.0; the bottommost wipes and topmost wipes would maintain equivalent lotion loads during storage. Additional lotion would not be needed to supersaturate the wipes in an effort to keep all of the wipes moist, which typically results in the bottommost wipes being soggy.

3. Absorptive Capacity

The following method, which is modeled after EDANA 10.4-02, is suitable to measure the absorptive capacity of any nonwoven web or finished wipe, when the web or wipe is either dry or wet, i.e., pre-moistened.

Materials/Equipment
1. Flat stainless steel wire gauze specimen holder with handle; flat gauze should be at least 120 mm×120 mm
2. Dish of size suitable for submerging the specimen holder, with specimen attached, in the test liquid to a depth of approximately 20 mm
3. Clips to hold the specimen on the specimen holder
4. Ring stand
5. Balance which reads to four decimal places
6. Stopwatch
7. Test liquid for the data disclosed herein is deionized water (resistivity>18 megaohms·cm)

Procedure

Prepare substrate test pieces for five separate absorptive capacity measurements. The test pieces should be cut to a size of approximately 100 mm×100 mm, and if an individual test piece weighs less than 1 gram, stack test pieces together to make sets that weigh at least 1 gram total. Fill the dish with a sufficient quantity of the test liquid, and allow it to equilibrate with room test conditions. Record the mass of the test piece(s) for the first measurement before fastening it to the wire gauze specimen holder with the clips. While trying to avoid the creation of air bubbles, submerge the specimen holder in the test liquid to a depth of approximately 20 mm and allow it to sit undisturbed for 60 seconds. Remove the specimen and holder from the liquid in the dish, remove all the fastening clips but one, and attach the sample holder to the ring stand so that the sample may vertically hang freely and drain for a total of 120 seconds. After the conclusion of the draining period, gently remove the specimen from the holder and record the specimen's mass. Repeat for the remaining four test pieces or test piece sets.

Calculation of Absorptive Capacity

Absorptive capacity is reported in units of grams of liquid composition per gram of the substrate being tested. Absorptive capacity is calculated as follows for each test that is conducted:

$$\text{Absorptive Capacity} = \frac{M_X - M_i}{M_i}$$

In this equation, $M_i$ is the mass in grams of the test piece(s) prior to starting the test, and $M_X$ is the mass in grams of the same after conclusion of the test procedure. Absorptive capacity is typically reported as the numerical average of at least five tests per sample.

4. Dynamic Absorption Time (DAT)

DAT provides a measure of the ability of the nonwoven web or wipe to absorb a test liquid, which is in turn used as a measure of how well a pre-moistened nonwoven web or wipe will retain its saturation load when stored in a stack in a liquid impervious container.

This test method measures the dimensions of a drop of lotion from the moment it is in contact with a dry nonwoven web or wipe to when the drop is absorbed by the nonwoven web or wipe. The method also measures the rate of change of the dimensions of the drop with respect to time. Webs or wipes characterized by low DAT and low initial contact angles may be more absorbent then those characterized by higher values.

Dynamic Absorbency Test measurements are made utilizing a Thwing Albert DAT Fibro 1100 (Thwing Albert, Pa.). The DAT is an automated computer-controlled instrument for measuring contact angle in porous materials. Contact angle refers to the angle formed by the substrate and the tangent to the surface of the liquid drop in contact with the substrate. More information on absorbency of sheeted materials using an automated contact angle tester can be found in ASTM D 5725-95.

As used in this application, contact angle involves recording the contact angle at the onset of the absorbency process. Specifically, the contact angle reported is the third of 3 consecutive angles in descending order beginning from the initial angle reported by the automated contact angle tester. The wetting or sorptive behavior between a liquid and a particular sheeted substrate is dependent, at least in part, upon the relationship of the surface energy (tension) of the liquid and the surface energy of the substrate. The theoretical relationship of these energies is complex and several mathematical theories have been proposed and practiced over time. In many cases, however, the contact angle of the fluid which will be in contact with the substrate is used to understand or predict in-process or end-use results of a particular printing, adhesion or sorptive application.

The contact angles measured by the DAT tester represent a defined angle between two surfaces under given conditions and are not the same as the contact angles defined by Laplace and the theory of capillary thermodynamics. However, DAT contact angle measurements do provide a means that is used in the art to characterize relative differences in absorbent properties of materials.

The equipment operates by controlling the volume and the ejection pulse of a small drop of fluid discharged directly onto the surface of a substrate. The height, base and angle produced as the drop settles and becomes absorbed into the porous media are determined based on an internal calibrated gray scale. In this application, a DAT 1100 series model (high speed camera resolution for porous absorbent paper substrates) is calibrated according to the manufacturer's instructions and using a 0.292 calibration sled. The instrument is set to discharge a 4 microliter ($\mu$L) drop of fluid, a stroke pulse of 8, canula tip of 340, drop bottom of 208, and paper position of 134. The substrate specimens are cut to approximately 0.5 inches and not exceeding the width of the sample sled. The substrate specimens are cut along the MD direction of the substrate to minimize neckdown and structural changes during handling. The substrate specimens as well as the lotion samples are allowed to equilibrate to 70±2° F. (50% RH) for at least 4 hrs. Fluid samples are prepared by filling a clean dry syringe (0.9 mm diameter, part #1100406, Thwing Albert) at least half way. The syringe should be rinsed with the fluid of interest prior to the test and this can be achieved by filling/emptying the syringe 3 consecutive times. In the present measurements, an aqueous lotion with a surface tension of 30 dynes/cm is used. Substrate and fluid specimens are loaded into the instrument according to the manufacturer's instructions. The controlling software is designed to eject the fluid onto the specimen and measure the following parameters: time, contact angle, base, height, and volume.

5. Pore Volume Distribution (PVD)

Pore Volume Distribution measurements are made on a TRI/Autoporosimeter (TRI/Princeton Inc. of Princeton, N.J.). The TRI/Autoporosimeter is an automated computer-controlled instrument for measuring pore volume distributions in porous materials (e.g., the volumes of different size pores within the range from 1 to 900 microns ($\mu$m) effective pore radii). Complimentary Automated Instrument Software, Release 2003.1/2005.1, and Data Treatment Software, Release 2002.1 is used to capture, analyze and output the data. More information on the TRI/Autoporosimeter, its operation and data treatments can be found in The Journal of Colloid and Interface Science 162 (1994), pp. 163-170.

As used in this application, determining PVD involves recording the increment of liquid that enters or leaves a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

$$\text{Pressure differential} = [(2)\gamma \cos \Theta]/\text{effective radius}$$

wherein $\gamma$=liquid surface tension, and $\Theta$=contact angle.

Typically pores are thought of in terms such as voids, holes or conduits in a porous material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide a means accepted in the art to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed (drained) at each pressure increment is the cumulative volume for the group of all pores between the preceding pressure setting and the current setting.

In this application of the TRI/Autoporosimeter, the liquid is a 0.1 weight % solution of octylphenoxy polyethoxy ethanol (Triton X-100 Solution from EMD, Product Number TX1568-1) in distilled water. The instrument calculation constants are as follows: $\rho$ (density)=1 g/cm$^3$; $\gamma$ (surface tension) =30 dynes/cm; cos $\Theta$=1°. A 1.22 µm Millipore Filter (Millipore Corporation of Bedford, Mass.) is employed on the test chamber's porous plate. A Plexiglass® plate weighing about 34 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in µm): 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 325, 350, 400, 450, 500, 550, 600, 650, 700, 750, 800, 850, 800, 750, 700, 650, 600, 550, 500, 450, 400, 350, 325, 300, 290, 280, 270, 260, 250, 240, 230, 220, 210, 200, 190, 180, 170, 160, 150, 140, 130, 120, 110, 100, 90, 80, 70, 60, 50, 40, 30, 20, 10, 5. This sequence starts with the sample dry, saturates it as the pore settings increase (1$^{st}$ absorption), and then subsequently drains the sample of all volume above an effective pore radius of 5.0 µm (desorption). The equilibrium rate is set at 15 mg/minute. No stop radius is specified.

In addition to the test materials, a blank condition (no sample between Plexiglass® plate and Millipore Filter) is run to account for any surface and/or edge effects within the chamber. Any pore volume measured for this blank run is subtracted from the applicable pore grouping of the test sample. This data treatment can be accomplished manually or with the available TRI/Autoporosimeter Data Treatment Software, Release 2002.1.

The TRI/Autoporosimeter reports the pore volume contribution to the total pore volume of the specimen. The pore volume contributions are reported in units of cubic millimeters per micron-grams (mm$^3$/µm-g). Peak values on the plot of volume distribution and average pore size represent the most abundant average pore sizes.

6. Ratio of Thickness to Basis Weight

The ratio of thickness to basis weight for the wipes of the present invention is calculated from values obtained using the following procedures.

Basis weight is measured prior to the application of any end-use lotion, cleaning solution, etc. to the nonwoven, and follows EDANA 40.3-90 (February 1996) as described herein below.

1. Cut at least three test pieces of the nonwoven to specific known dimensions, preferably using a pre-cut metal die and die press. Each test piece typically has an area of at least 0.01 m$^2$.
2. Use a balance to determine the mass of each test piece in grams; calculate basis weight (mass per unit area), in grams per square meter (gsm), using equation (1).

$$\text{Basis Weight} = \frac{\text{Mass of Test Piece}}{\text{Area of Test Piece}} \quad (1)$$

3. For a nonwoven sample, report the numerical average basis weight for all test pieces.
4. If only a limited amount of the nonwoven is available, basis weight may be measured and reported as the basis weight of one test piece, the largest rectangle possible.

Wet thickness measurement follows EDANA 30.4-89 (February 1996). The nonwoven substrates are wetted or lotioned prior to testing as described herein. This procedure is for normal (non-bulky) nonwovens, defined by EDANA as nonwovens having a maximum thickness less than 20 mm.

1. Cut at least ten test pieces, each having an area greater than 2500 mm$^2$, preferably using a pre-cut metal die and die press. Alternatively, multiple measurements of a larger overall sample can be used to get ten total measurements.
2. Lotion (wet) the samples to the desired lotion load, typically using a liquid with a surface tension of 20-35 dynes/cm, by applying the necessary amount of lotion calculated using equation (2). Lotion load is defined as the percentage of the dry substrate's mass that the lotion mass represents. For example, a lotion load of 1.0 (equivalently, 100% saturation) indicates that the mass of lotion on the substrate is equal to the dry substrate mass.

$$\text{Mass of Lotion Applied}=(\text{Lotion Load})\times(\text{Mass of Dry Nonwoven}) \quad (2)$$

3. Measure the wet thickness (mm) of the nonwoven sample using an apparatus with a vertically-moving presser-foot that moves toward a stationary reference plate, on which the nonwoven test piece sits, and exerts a pressure of 0.5 kilo Pascals (kPa) on the test area. The instrument must report thickness to at least a 0.01 mm graduation.
4. The wet thickness of the nonwoven sample is reported as the numerical average of the wet thickness of all the test pieces.

IV. Examples

Example 1

Figure 9:
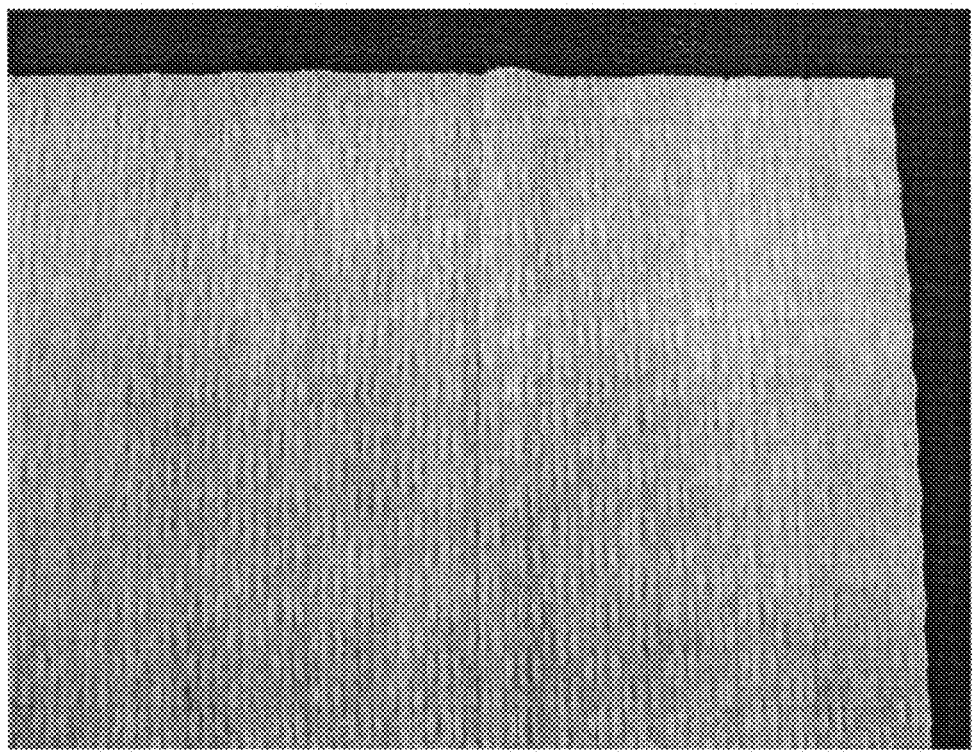
FIG. 9 is a view of a pre-moistened wipe with the pattern of first regions and second regions.

A pre-moistened wipe 52 according to the present invention is prepared as follows. A polyethylene-polypropylene bicomponent fiber substrate, manufactured by BBA Fiberweb, Simpsonville, S.C., U.S.A., is the starting spunbond. This spunbond is a 20 gsm spunlaid nonwoven comprising about 2.0 denier fibers that are thermally bonded. The pulp is a 20 gsm Northern Softwood Kraft wetlaid tissue with no additional wet chemical additives such as wet strength resins. The composite is formed by layering two outer layers of the spunbond nonwovens with an inner layer of pulp and hydroentangling to the extent that the fibers from the layers are intertwined. The composite is provided with texture as shown in FIG. 9. The composite has a basis weight of 66 gsm.

Figure 10:
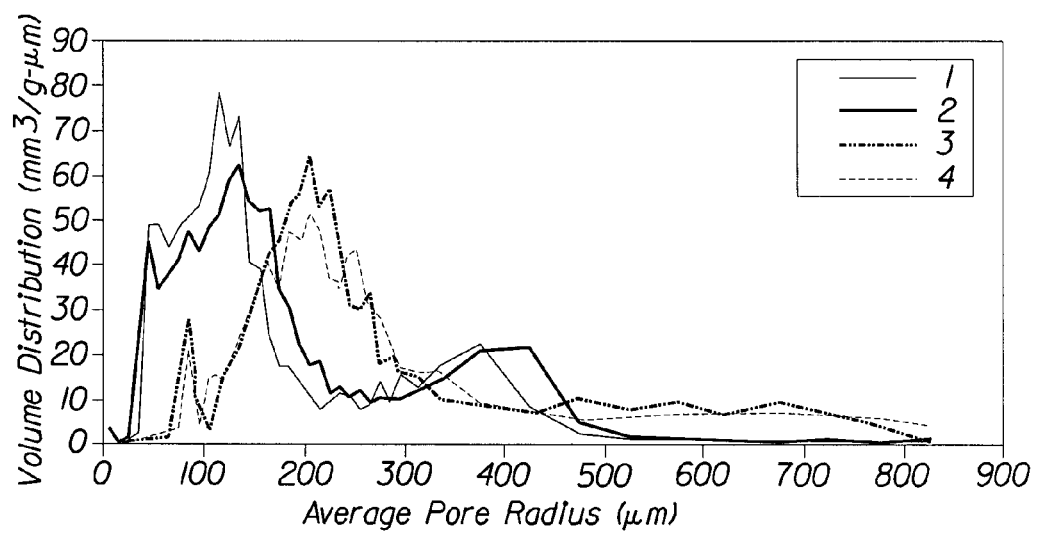
FIG. 10 is a plot of the pore volume distribution versus the average pore radius of pre-moistened wipes according to the present invention and comparative pre-moistened wipes.

Physical characteristics including fiber type, fiber denier, percent pulp, basis weight, wet thickness, saturation gradient index, contact angle, dynamic absorption time (DAT) and absorbent capacity are shown in Table 1. To measure saturation gradient index, 80 of the pre-moistened wipes are stacked and saturation loaded to an average of about 358% with a lotion having a surface tension of 30 dynes per centimeter. The wipes are folded in a Z-fold configuration and placed in a stack to a height of about 82 millimeters. The relationship between pore volume distribution and average pore radius is shown in FIG. 10. The pore volume distribution shows a multimodal characteristic with a peak below an average pore radius of 200 µm and a peak above an average pore radius of 300 µm.

Example 2

A pre-moistened wipe 52 according to the present invention is prepared per Example 1, with the exception that the spunbond comprises about 3.0 denier polyethylene-polypropylene bicomponent fibers, instead of 2.0 denier polyethylene-polypropylene bicomponent fibers.

Physical characteristics including fiber type, fiber denier, percent pulp, basis weight, wet thickness, saturation gradient index, contact angle, dynamic absorption time (DAT) and absorbent capacity are shown in Table 1. To measure saturation gradient index, 80 of the pre-moistened wipes are stacked and saturation loaded to an average of about 347% with a lotion having a surface tension of 30 dynes per centimeter. The wipes are folded in a Z-fold configuration and placed in a stack to a height of about 105 millimeters. The relationship between pore volume distribution and average pore radius is shown in FIG. 10. The pore volume distribution shows a multi-modal characteristic with a peak below an average pore radius of 200 µm and a peak above an average pore radius of 300 µm.

Comparative Example 3

A pre-moistened wipe is prepared as follows. A composite nonwoven is formed by hydroentangling two outer layers of a spunbond nonwoven with an inner layer of pulp to the extent that fibers from the layers are intertwined. The spunbond outer layers have basis weights of about 20 gsm, and comprise about 3.0 denier polypropylene fibers which are spunlaid and thermally bonded. The spunbond material is manufactured by PGI, Waynesboro, Va. U.S.A. The inner pulp layer is about a 20 gsm Northern Softwood Kraft wetlaid tissue with no additional wet chemical additives such as wet strength resins. The composite nonwoven is processed to provide a texture as shown in FIG. 9.

Physical characteristics including fiber type, fiber denier, percent pulp, basis weight, wet thickness, saturation gradient index, contact angle, dynamic absorption time (DAT) and absorbent capacity are shown in Table 1. To measure saturation gradient index, 80 of the pre-moistened wipes are stacked and saturation loaded to an average of about 334% with a liquid composition having a surface tension of 30 dynes per centimeter. The wipes are folded in a Z-fold configuration and placed in a stack to a height of about 110 millimeters. The relationship between pore volume distribution and average pore radius is shown in FIG. 10. The pore volume distribution shows a unimodal characteristic with a peak around an average pore radius of 200 µm.

Comparative Example 4

A pre-moistened wipe is prepared per Comparative Example 3, with the exception that the spunbond comprises about 4.0 denier polypropylene fibers instead of 3.0 denier polypropylene fibers.

Physical characteristics including fiber type, fiber denier, percent pulp, basis weight, wet thickness, saturation gradient index, contact angle, dynamic absorption time (DAT) and absorbent capacity are shown in Table 1. To measure saturation gradient index, 80 of the pre-moistened wipes are stacked and saturation loaded to an average of about 337% with a lotion having a surface tension of 30 dynes per centimeter. The wipes are folded in a Z-fold configuration and placed in a stack to a height of about 115 millimeters. The relationship between pore volume distribution and average pore radius is shown in FIG. 10. The pore volume distribution shows a unimodal characteristic with a peak around an average pore radius of 200 µm.

TABLE 1

| Property | Example 1 | Example 2 | Example 3 | Example 4 |
|---|---|---|---|---|
| Spunbond Type | 50/50 PE/PP bicomponent | 50/50 PE/PP bicomponent | PP | PP |
| Spunbond denier (dpf) | 2 | 3 | 3 | 4 |
| % Pulp | 32 | 30 | 29 | 30 |
| Basis Weight (gsm) | 63.9 | 65.9 | 68.5 | 67.0 |
| Wet Thickness (mm) | 0.64 | 0.75 | 0.84 | 0.77 |
| Wet Thickness/Basis Weight Ratio (mm/gsm) | 0.010 | 0.011 | 0.012 | 0.011 |
| Two-Week Saturation Gradient Index | 1.26 | 1.38 | 1.64 | 1.83 |
| One-Month Saturation Gradient Index | 1.27 | 1.31 | 1.76 | 1.82 |
| Three-Month Saturation Gradient Index | 1.29 | 1.35 | 1.79 | 1.84 |
| Contact Angle (degrees) | — | 46 | 54 | — |
| DAT (s) | — | 0.057 | 0.454 | — |
| Absorbent Capacity (g/g) | 3.54 | 3.86 | 4.59 | 4.39 |

The data in Table 1 demonstrate that the topmost wipes in the stacks of the present invention retain their lotion load while being stored. Namely, the embodiments in Examples 1 and 2 have desirable saturation gradient indexes falling between 1.0 and 1.5 that are maintained for as long as three months. This result is obtained for the wipes stack embodied in Example 2 despite the fact that it is comprised of wipes that are characterized by a high lofted texture as measured by the wet thickness to basis weight ratio of 0.01 or more, and a fiber denier as high as about 3 dpf.

In contrast, the stacks of comparative Examples 3 and 4 are characterized by saturation gradient indexes that are undesirable, in that they are above 1.5. These values indicate that the lotion tends to drain from the topmost wipes in these stacks as compared to the topmost wipes embodied in the present invention.

The data in Table 1 demonstrate a correlation between the values observed for dynamic absorption time and contact angle for individual wipes and their performance in a stack. For instance, comparative Examples 3 and 4 have higher values for dynamic absorption time and contact angle than Examples 1 and 2.

For examples 1 and 2, it appears that by altering the type of fiber from polypropylene fibers to polyethylene-polypropylene bicomponent fibers, the saturation gradient index, dynamic absorption time and contact angle of the composite nonwoven decreased to desirable levels. Without wishing to be bound by theory, it is believed that the intertwined combination of polyethylene-polypropylene bicomponent fibers with pulp provide a unique ability to absorb and then retain lotion in a stack of folded wipes. Without wishing to be bound by theory, it is also believed that the surface chemistry characteristics of other materials could be modified to achieve desirable saturation gradient indexes, dynamic absorption times and contact angles when combined with pulp in this intertwined fashion.

It is also believed, without wishing to be bound by theory, that an intertwined combination of polyethylene-polypropylene bicomponent fibers, especially the larger 3 denier fibers, with pulp provides the nonwoven with sufficient slippage between the fibers, stretch and resilience, such that the nonwovens are particularly suited for additional processing steps such as adding lofted texture, which in turn may decrease density and increase average pore size distribution but will also retain a unique ability to absorb and then retain lotion in a stack of folded wipes.

It is further hypothesized without being bound thereto, that the intertwined combination of polyethylene-polypropylene bicomponent fibers, especially the larger 3 denier fibers, with pulp in conjunction with a lofted texture may allow for nonwovens suitable for use as wet wipes that have a cumulative multi-modal pore volume distribution of the assembled structure characterized by a peak below an average pore radius of 200 μm to enable good lotion retention in a stack of wipes and a peak above an average pore radius of 300 μm to enable for good lotion release during use but will also retain a unique ability to absorb and then retain lotion in a stack of folded wipes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A stack of pre-moistened wipes, said stack comprising a height from about 50 millimeters to about 300 millimeters and a saturation gradient index from about 1.0 to about 1.5, wherein said wipes comprise:
   (a) a composite of at least a first layer and third layer of fibrous nonwoven webs, said first layer and said third layer comprising synthetic fibers with an average fiber denier from about 2.5 to about 6.0, said composite further comprises a second layer comprising pulp, wherein said first layer is joined to a face of said second layer in a face to face relationship by bonding between the layers and said third layer is joined to a second face of said second layer in a face to face relationship by bonding between the layers, wherein said bonding comprises intertwining of the fibers between the layers;
   (b) a saturation loading from about 1.5 to about 6.0 grams of liquid composition per gram of wipe, wherein said liquid composition has a surface tension from about 20 to about 35 dynes per centimeter;
   (c) a dynamic absorption time from about 0.01 to about 0.4 seconds; and
   (d) a first side and a second side opposed thereto, wherein the wipes are interleaved with one another such that at least a portion of the first side of one wipe overlaps at least a portion of the second side of another wipe.

2. The stack of pre-moistened wipes according to claim 1, wherein said composite comprises at least one first region being substantially in a plane of said composite and at least one second non-planar region, said second non-planar region comprising out-of-said-plane protruding elements.

3. The stack of pre-moistened wipes according to claim 1, wherein said synthetic fibers are selected from the group consisting of monocomponent fibers; multicomponent fibers; multiconstituent fibers; and combinations thereof.

4. The stack of pre-moistened wipes according to claim 1, wherein said wipes comprise from about 30% to about 70% by weight of synthetic fibers and from about 70% to about 30% by weight of pulp.

5. The stack of pre-moistened wipes according to claim 3, wherein said multicomponent fibers comprise: a core comprising polypropylene; and a sheath comprising polyethylene.

6. The stack of pre-moistened wipes according to claim 1, wherein said wipes have an absorptive capacity from about 2.5 to about 15.0 grams per gram of dry substrate.

7. The stack of pre-moistened wipes according to claim 1, wherein said wipes comprise a ratio of wet thickness to basis weight from about 0.008 to about 0.024 millimeters per grams per square meter (mm/gsm).

8. A stack of pre-moistened wipes, said stack comprising a height from about 50 to about 300 millimeters and a saturation gradient index from about 1.0 to about 1.5, wherein:
   (a) said wipes having a longitudinal axis and a transverse axis orthogonal thereto and comprising a composite of at least two layers of fibrous nonwoven webs wherein said composite comprises a strainable network formed from a plurality of first regions in the form of a reticulated structure substantially in a plane of said composite, a plurality of second non-planar regions comprising out-of-said-plane protruding elements in the form of rib-like ridges and furrows, and transition regions located at the interface between the first regions and the second regions, the rib-like ridges and furrows of the second regions having a major rib axis substantially parallel to the longitudinal axis of the wipe and a minor rib axis substantially parallel to the transverse axis of the wipe wherein said wipes further comprise:
      i. synthetic fibers with an average fiber denier from about 1.0 to about 6.0; and
      ii. saturation loading from about 1.5 to about 6.0 grams of liquid composition per gram of wipe, wherein said liquid composition has a surface tension from about 20 to about 35 dynes per centimeter.

9. The stack of pre-moistened wipes according to claim 8, wherein said fibers are shaped.

10. The stack of pre-moistened wipes according to claim 8, wherein said synthetic fibers are selected from the group consisting of monocomponent fibers, multicomponent fibers, multiconstituent fibers and combinations thereof.

11. The stack of pre-moistened wipes according to claim 10, wherein said fibers comprise: polyolefins selected from the group consisting of polypropylene, polyethylene and combinations thereof; starch; viscose; polylactic acid; and combinations thereof.

12. The stack of pre-moistened wipes according to claim 11, wherein said fibers are multicomponent fibers comprising a sheath and core, wherein said sheath comprises polyethylene and said core comprises polypropylene.

13. The stack of pre-moistened wipes according to claim 8, wherein said at least two layers of fibrous nonwoven webs comprise a first layer and a third layer of said composite, and said composite further comprises a second layer comprising pulp, said first layer is joined to a face of said second layer in a face to face relationship by bonding between the layers and said third layer is joined to a second face of said second layer in a face to face relationship by bonding between the layers, wherein said bonding comprises intertwining of the fibers between the layers.

14. The stack of pre-moistened wipes according to claim 13, wherein said wipes comprise from about 30% to about 70% by weight of synthetic fibers and from about 70% to about 30% by weight of pulp.

15. The stack of pre-moistened wipes according to claim 13, wherein said fibrous nonwoven webs are made via:
   a. fiber laying steps selected from the group consisting of: spunlaying; carding; airlaying; wetlaying; meltblowing; coforming and combinations thereof; and
   b. fiber bonding steps selected from the group consisting of: thermal bonding; spunbonding; ultrasonic bonding; spunlacing; chemical adhesion; through air bonding; and combinations thereof.

16. The stack of pre-moistened wipes according to claim 8, wherein said wipes have a ratio of wet thickness to basis weight from about 0.008 to about 0.024 millimeters per grams per square meter (mm/gsm).

17. The stack of pre-moistened wipes according to claim 8, wherein said wipes have an absorptive capacity from about 2.5 to about 15.0 grams per gram of dry substrate.

18. The stack of pre-moistened wipes according to claim 8, wherein said wipes have a dynamic absorption time from about 0.01 to about 0.4 seconds.

19. The stack of pre-moistened wipes according to claim 8, wherein said wipes comprise pores with a pore volume distribution and an average pore radius, such that when said pore volume distribution is plotted against said average pore radius a plot comprising a multimodal distribution is obtained, wherein at least one peak is below about 200 microns and at least one peak is above about 300 microns.

20. The stack of pre-moistened wipes according to claim 8 comprising two layers of fibrous nonwoven webs, wherein one layer comprises spunbond synthetic fibers and one layer comprises pulp.

21. A stack of pre-moistened wipes, said stack comprising:
   (a) a height from about 50 millimeters to about 300 millimeters;
   (b) a saturation gradient index from about 1.0 to about 1.5; and
   (c) a saturation loading from about 1.5 to about 6.0 grams of liquid composition per gram of wipe, wherein said liquid composition has a surface tension from about 20 to about 35 dynes per centimeter, wherein said wipes comprise:
      i. a composite of at least a first layer and a third layer of spunbond nonwoven webs, said first layer and said third layer comprising synthetic multicomponent fibers with an average fiber denier from about 1.0 to about 6.0 and said composite further comprises a second layer comprising pulp, wherein said first layer is joined to a face of said second layer in a face to face relationship by bonding between the layers and said third layer is joined to a second face of said second layer in a face to face relationship by bonding between the layers, wherein said bonding comprises intertwining of the fibers between the layers achieved via hydroentanglement;
      ii. a saturation loading from about 1.5 to about 6.0 grams of liquid composition per gram of wipe, wherein said liquid composition has a surface tension from about 20 to about 35 dynes per centimeter;
      iii. a dynamic absorption time from about 0.01 to about 0.4 seconds; and
      iv. a first side and a second side, wherein the wipes are interleaved with one another such that at least a portion of the first side of one wipe overlaps at least a portion of the second side of another wipe.

22. The stack of pre-moistened wipes according to claim 21, wherein said composite comprises at least one first region being substantially in a plane of said composite and at least one second non-planar region, said second non-planar region comprising out-of-said-plane protruding elements comprising a plurality of rib-like ridges and furrows.

23. The stack of pre-moistened wipes according to claim 8, wherein the strainable network provides the wipe with elastomeric properties.

* * * * *